United States Patent
Shimizu et al.

(10) Patent No.: US 7,499,381 B2
(45) Date of Patent: Mar. 3, 2009

(54) OPTICAL DISK APPARATUS

(75) Inventors: Shinya Shimizu, Daito (JP); Tetsuya Shihara, Daito (JP); Tsuyoshi Eiza, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 11/903,723

(22) Filed: Sep. 24, 2007

(65) Prior Publication Data
US 2008/0144461 A1 Jun. 19, 2008

(30) Foreign Application Priority Data
Sep. 27, 2006 (JP) .............................. 2006-262346

(51) Int. Cl.
*G11B 7/00* (2006.01)
(52) U.S. Cl. ................................ 369/44.23; 369/112.02
(58) Field of Classification Search .................... None
See application file for complete search history.

(56) References Cited

U.S. PATENT DOCUMENTS

| | | | | |
|---|---|---|---|---|
| 4,984,229 A * | 1/1991 | Nedvidek | ................ | 369/44.24 |
| 5,541,906 A * | 7/1996 | Kobayashi | ................ | 369/44.23 |
| 6,288,986 B1 * | 9/2001 | McDonald et al. | ....... | 369/44.23 |
| 6,584,057 B1 | 6/2003 | Araki et al. | | |
| 6,628,582 B2 * | 9/2003 | Furukawa | ................ | 369/44.32 |
| 6,804,185 B2 * | 10/2004 | Kikuchi et al. | ......... | 369/112.02 |
| 2001/0033541 A1 | 10/2001 | Iwasaki et al. | | |
| 2001/0055257 A1 * | 12/2001 | Sato et al. | ................ | 369/53.28 |
| 2002/0172110 A1 | 11/2002 | Tateishi et al. | | |
| 2002/0181383 A1 | 12/2002 | Seong et al. | | |

FOREIGN PATENT DOCUMENTS

| | | |
|---|---|---|
| JP | S62-200537 A | 9/1987 |
| JP | S63-044329 A | 2/1988 |
| JP | 2000-132855 A | 5/2000 |
| JP | 2002-245639 A | 8/2002 |
| JP | 2002-342952 | 11/2002 |
| JP | 2002-358677 A | 12/2002 |
| JP | 2002-373441 A | 12/2002 |
| JP | 2004-206763 A | 7/2004 |
| JP | 2005-196947 A | 7/2005 |
| JP | 2005-251255 A | 9/2005 |
| JP | 2005-332558 | 12/2005 |

OTHER PUBLICATIONS

The extended European search report, pursuant to Rule 62 EPC dated Jan. 23, 2008, searched on Jan. 14, 2008.
Japanese Notice of the reason for refusual, dated Oct. 15, 2008.

* cited by examiner

*Primary Examiner*—Peter Vincent Agustin
(74) *Attorney, Agent, or Firm*—Yokoi & Co., U.S.A., Inc.; Peter Ganjian (57) ABSTRACT

An optical disk apparatus having an aberration correcting unit for correcting aberrations generated on the recording surface of an optical disk based on received correcting signals, a servo signal generating unit for generating servo signals based on the reflection lights from the optical disk and predefined parameters, and a birefringence detecting unit that detects the degrees of birefringent portions on the recording surface based on received the servo signals and generates the correcting signals for correcting aberrations according to the detected degrees of the birefringent portions and outputs the correcting signals.

9 Claims, 7 Drawing Sheets

Asymmetric Diversity $S=(\alpha-\beta)/(\alpha+\beta) \times 100$

FIG. 4

(a) Without Birefringence (b) With Birefringence
(causing Spherical Aberration)

(c) With Birefringence
(causing Coma Aberration)

| Spherical Aberration Correcting Signal | FB1 | FB2 | FO |
|---|---|---|---|
| Sa1 | f11 | f21 | fo1 |
| Sa2 | f12 | f22 | fo2 |
| ⋮ | ⋮ | ⋮ | ⋮ |
| San | f1n | f2n | fon |

80

OPTICAL DISK APPARATUS

CROSS-REFERENCES TO RELATED APPLICATIONS

The present application is related to the Japanese Patent Application No. 2006-262346, filed Sep. 27, 2006, the entire disclosure of which is expressly incorporated by reference herein.

BACKGROUND OF THE INVENTION (1.) Field of the Invention

The present invention relates to an optical disk apparatus.

(2.) Description of Related Art

In Japanese Unexamined Patent Application Publication No. 2002-342952, a recording & reproducing apparatus of optical recording media equipped with control units of a focus servo and a tracking servo for aberration correction is disclosed. In addition, in Japanese Unexamined Patent Application Publication No. 2005-332558, an optical disk apparatus equipped with a spherical aberration correcting section that corrects the spherical aberrations generated in optical beams in advance, a focus error detecting unit that detects focus error signals, and a control unit that adjusts the signal amplitudes output from the focus error detecting unit to predefined values after the amounts of spherical aberrations are made equal to predefined amounts by the spherical aberration control unit.

There are cases where the recording surfaces of optical disks on which an optical disk apparatus records data and from which the optical disk apparatus reproduces data have so called birefringent portions. The birefringent portions come into existence owing to internal stresses that are generated during the disk production process. If there are birefringent portions on the recording surface of an optical disk, when laser beams are focused on the recording surface, the patterns of the focused light spots get distorted or blurred so that the amounts of the reflected lights may decrease or improperly change. Such a decrease or change of the amounts of the reflected lights deteriorate reproduced signals and servo signals that are generated with the use of the reflection lights, with the result that the so-called servo control for putting the focused light spots on the tracks of the recording surfaces will get unstable.

In either of the above-mentioned patent documents, however, there are no measures taken to prevent the deteriorations in the quality of reproduced signals or servo signals owing birefringence.

BRIEF SUMMARY OF THE INVENTION

The present invention discloses an optical disk apparatus that prevent the deteriorations in the quality of reproduced signals or servo signals owing to birefringent portions on an optical disk and improve the qualities of servo control and reproducing signals.

The present invention provides an optical disk apparatus that includes an aberration correcting unit for correcting aberrations generated when laser beams are focused on a recording surface of an optical disk with a use of an objective lens; a servo signal generating unit for generating servo signals based on reflected signals sent from the optical disk and outputting the servo signals; a servo control unit for putting focused light spots on tracks of the optical disk by controlling a drive of the objective lens based on a received servo signals; a birefringence detecting unit configured so that the birefringence detecting unit detects a degree of the birefringent portions on the recording surface based on the received servo signals and generates aberration correcting signals to correct the aberrations based on the degree of the birefringent portions detected and outputs the aberration correcting signals. The birefringence detecting unit receives the servo signals from the servo signal generating unit. In other words, the servo signal generating unit sends the servo signals to both the servo control unit and the birefringence detecting unit. The aberration correcting unit is configured to correct the aberrations based on the received correcting signals through driving prescribed aberration correcting elements; and the servo signal generating unit, when generating the servo signals using electric signals according to the reflected signals and predefined parameters, determines a parameter values according to a degree of the aberration correction. If there is a birefringent portion on the recording surface of an optical disk, the patterns of focused light spots get distorted or blurred. In the present invention, however, because the pattern changes of the focused light spots can be grasped as an aberration, the degree of the birefringent portion is detected and the aberration is corrected according to the detected degree.

If an aberration due to a birefringent portion is corrected, the reflected lights received by the servo signal generating unit shows nearly normal amounts, with the result that the values of electric signals obtained by converting the reflected lights are different from the values obtained without correcting the aberration. When the servo signals are calculated with the use of the electric signals and predefined parameters, if the parameters set before the aberration correction are used intact, the optimal servo signals for the servo control performed by the servo control unit cannot be obtained. In other words, when the aberration correction is performed, the parameter values used for generating the servo signals must be changed according to the amount of the aberration correction. Therefore, the servo signal generating unit, when generating servo signals using electric signals according to reflected signals and predefined parameters, determines the parameter values according to the amount of the aberration correction.

As described above, the present invention can prevent the deteriorations in the quality of reproduced signals and servo signals owing to the birefringent portions of an optical disk because the aberrations generated owing to the birefringent portions are corrected. In addition, after the aberration correction is performed, the optimal parameter values are selected according to the amount of the aberration correction when the servo signals are generated with the use of the reflected lights and plural parameters. Therefore, the stable servo control can be performed because the servo control unit can properly put the focused light spots on the tracks of the recording surfaces.

Various approaches can be adopted as a method to detect birefringence. As one of such approaches, the birefringence detecting unit detects asymmetric diversities of the servo signal waveforms with reference to a predefined reference potential, and defines magnitude of the asymmetric diversities as the degree of birefringence. The servo signals are signals that represent the deflections of the focused light spots from the tracks of an optical disk so that the magnitudes of the asymmetric diversities of the servo signal waveforms can be said to approximately represent the degree of birefringent portions near the focused light spots. Therefore, in the present invention, the degrees of the birefringent portions of the optical disk can be indirectly detected through detecting the asymmetric diversities of the servo signal waveforms of the optical disk.

As an additional approach, or as an alternative approach to the above mentioned one, the birefringence detecting unit extracts the direct-current component of a servo signal and detects the potential difference between the potential of the direct-current component and a predefined reference potential, and defines magnitude of the potential difference as the degree of birefringence. If the difference between the potential of the direct-current component and the predefined reference potential exceeds a certain value, the servo signal waveform can be said to be considerably distorted, which suggests that there is a birefringent portion on the optical disk. Therefore, the degree of the birefringent portion of an optical disk can be indirectly detected through comparing the potential of the direct-current component of the servo signal waveform of the optical disk and the predefined reference potential.

Equipped with a parameter decision table that stipulates the relation between the correcting signals and the parameter values in advance, the servo signal generating unit can refer to the parameter decision table when the parameter values are decided according to the correcting signals generated by the birefringence detecting unit. In other words, the relation between the amounts of the aberration correction and the parameter values that are used for generating the servo signals based on the reflected lights after the aberration correction is stipulated in advance, and the parameter values are decided according to the relation. As a result, the servo signals can be easily and properly generated.

Plural parameter decision tables can be set corresponding to various conditions. For example, the servo signal generating unit can be equipped with plural parameter decision tables corresponding to the types of optical disks that have different characteristics of birefringence. The characteristics of birefringence differ according to, for example, manufacturers of optical disks, production lots of optical disks, or product classes of optical disks. Therefore, plural parameter decision tables are provided corresponding to the types of optical disks. After getting information about the type of the optical disk from which information is reproduced or to which information is recorded, that is, the manufacturer, the production lot, or the product class of the optical disk and so on, the servo signal generating unit selects a parameter decision table corresponding to the type of the optical disk, and selects the parameter values according to the correcting signal with reference to the selected parameter decision table. As a result, the parameters, which need to be selected after correcting the aberration owing to the birefringent portion of the optical disk from which information is reproduced or to which information is recorded, can be easily selected, and these parameters are optimal parameters used for generating the servo signals.

The characteristics of birefringence of an optical disk differ not only according to the type of the optical disk, but also according to the positions of the recording surface of the optical disk, or the temperature around the optical disk. Therefore, the servo signal generating unit can be equipped with plural parameter decision tables corresponding to the positions of the recording surface of an optical disk when the positions show different characteristics of birefringence. In this case, the servo signal generating unit obtains information about the position of an objective lens facing the recording surface to select the corresponding parameter decision table, and decides the parameters values with reference to the selected parameter decision table. The servo signal generating unit can be also equipped with plural parameter decision tables corresponding to temperatures around an optical disk when the characteristics of birefringence differ according to the temperatures. In this case, the servo signal generating unit obtains information about the current temperature around the optical disk, selects a parameter decision table corresponding to the temperature, and decides the parameter values with reference to the selected parameter decision table.

The servo signal generating unit generates a focus error signals (FE) as one type of servo signal; the birefringence detecting unit generates a spherical aberration correcting signal to correct a spherical aberration according to the degree of the birefringent portion detected based on FE; and the aberration correcting unit corrects the spherical aberration through driving the aberration correcting elements with the use of the spherical aberration correcting signal. The servo signal generating unit also generates a tracking error signals (TE) as one type of servo signal; the birefringence detecting unit generates a coma aberration correcting signal to correct a coma aberration according to the degree of the birefringent portion detected based on TE; and the aberration correcting unit corrects the coma aberration through driving the aberration correcting elements based on the coma aberration correcting signal. In other words, in the present invention, the correcting signals for correcting the concentric spreads of the focused light images owing to birefringence, that is, the spherical aberrations, are generated based on the degrees of the birefringent portions detected with the use of FE, and the spherical aberrations are corrected with the use of the generated correcting signals. In addition, in the present invention, the correcting signals for correcting the extensions of the focused light spot images towards a given direction owing to birefringence, that is, the coma aberrations, are generated based on the degrees of the birefringent portions detected with the use of TE, and the coma aberrations are corrected with the use of the generated correcting signals. As described above, the present invention makes it possible to detect the degrees of both a spherical aberration and a coma aberration owing to birefringence and to accurately correct both aberrations according to their respective detected results.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

One of the preferred embodiments of the present invention will be described in detail hereafter with reference to the attached drawings.

Figure 1:
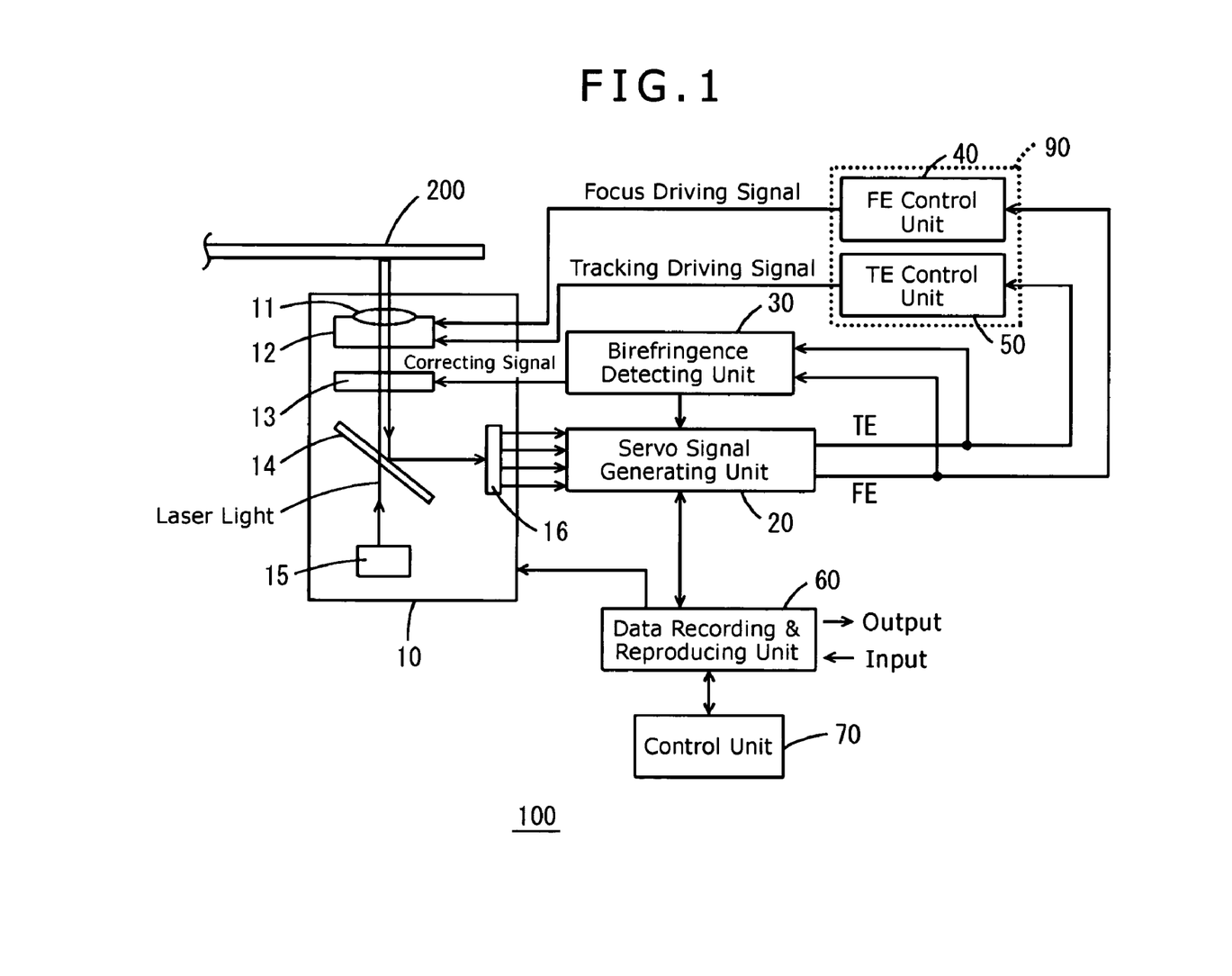
FIG. 1 is an example of a block diagram showing a schematic configuration of an optical disk apparatus.

FIG. 1 is a block diagram showing a schematic configuration of an optical disk apparatus 100 related to this embodiment of the present invention. The optical disk apparatus 100 mainly includes an optical pickup 10, a servo signal generating unit 20, a birefringence detecting unit 30, an FE control unit 40, a TE control unit 50, a data recording & reproducing unit 60, and a control unit 70. The optical disk apparatus 100 records data on the optical disk 200 and reads data stored on the optical disk 200 by irradiating laser beams on the recording surface of the optical disk 200 placed on a turn table (not shown).

The optical pickup 10 includes an objective lens 11, an actuator 12, an aberration correcting unit 13, a half mirror 14, a light source 15 including a laser diode, and a photo detector 16.

The laser beams irradiated from the light source 15 enter the aberration correcting unit 13 after passing through the half mirror 14, and then the laser beams are focused on the recording surface of the optical disk 200 by the objective lens 11. The laser beams reflected by the recording surface (reflected lights) pass through the objective lens 11 and the aberration correcting unit 13 again, and then the laser beams are received by the photo detector 16 after the route thereof being changed by the half mirror 14. In this embodiment of the present invention, it is assumed that the photo detector 16 is divided into four light-sensitive areas (four light-sensitive elements). In other words, the photo detector 16 is a division-structured detector. The photo detector 16 converts the received lights into electric signals, and then outputs them.

The servo signal generating unit 20 generates reproduced signals, and a focus error signals (FE) and a tracking error signals (TE) as servo signals based on the outputs from the photo detector 16. The generation of FE and TE will be described later.

The reproduced signals output from the servo signal generating unit 20 enter the data recording & reproducing unit 60. In the data recording & reproducing unit 60, the process of a demodulation, the process of an error detection, and the process of a correction are performed on the reproduced signals, and the extracted information is converted into digital data of the predefined format (for example, in MPEG2 format). And then the digital data is output as images and so on according to the display output instructions from the control unit 70. In addition, when receiving recording data from a TV broadcasting receiving unit or an external apparatus (neither is shown in FIG. 1), the data recording & reproducing unit 60 converts the recording data into RF signals and sends them to the optical pickup 10. In the optical pickup 10, laser beams modulated according to the recording data are irradiated to the recording surface of the optical disk 200.

The control unit 70 includes CPUs and ROMs, etc. that store plural programs. The control unit 70, which is connected to the data recording & reproducing unit 60 and other units of the optical disk apparatus 100, is capable of communicating with these units, and control the whole of the optical disk apparatus 100.

The servo signal generating unit 20 sends FE and TE to both the birefringence detecting unit 30 and the servo control unit 90. The FE control unit 40 and the TE control unit 50 are collectively called the servo control unit 90. The servo control unit 90 generates a focusing driving signal (focus driving signal) to make the value of FE zero (reference level) based on FE, and a tracking driving signal to make the value of TE zero (reference level) based on TE, and sends these signals to the actuator 12 of the optical pickup 10.

The actuator 12 is a device that is capable of driving a lens holder that holds the objective lens 11 along the light axis of the laser beams (focusing direction) and also along the radial direction of the optical disk 200 (tracking direction) in minute detail. In other words, the actuator 12 performs servo control in the focusing direction and in the tracking direction by driving the lens holder in minute detail based on the focusing driving signal and the tracking driving signal. The above mentioned servo control allows the laser beams irradiated from the objective lens 11 to follow the desired tracks of the optical disk 200, and at the same time allows the laser beams to be focused on the above mentioned tracks.

The optical disk apparatus 100 is equipped with a spindle motor (not shown) for driving the turntable at the predefined rotating speed, and this spindle motor is controlled by the control unit 70. The optical disk apparatus 100 is also equipped with a guide rail (not shown) that is stretched along the radial direction of the optical disk 200, and the optical disk apparatus 100 moves the optical pickup 10 that is engaged with the thread of the guide rail along the above mentioned radial direction according to the rotation of the guide rail. The guide rail is rotated by a stepping motor (not shown). The rotation of the guide rail performed by the stepping motor is controlled based on seek signals output by the control unit 70.

The birefringence detecting unit 30 detects the degrees of birefringent portions produced in the optical disk 200 based on incoming FE and TE. Then the birefringence detecting unit 30 generates a spherical aberration correcting signal and a coma aberration correcting signal according to the detected degrees of the birefringent portions, and sends them to the aberration correcting unit 13. The aberration correcting unit 13 performs an aberration correction through driving its built-in aberration correcting elements based on the above mentioned two correcting signals. How to detect birefringence and how to perform the subsequent aberration correction will be described later. The birefringence detecting unit 30 also informs the servo signal generation unit 20 of the generated spherical aberration correcting signal and coma aberration correcting signal.

Figure 2:
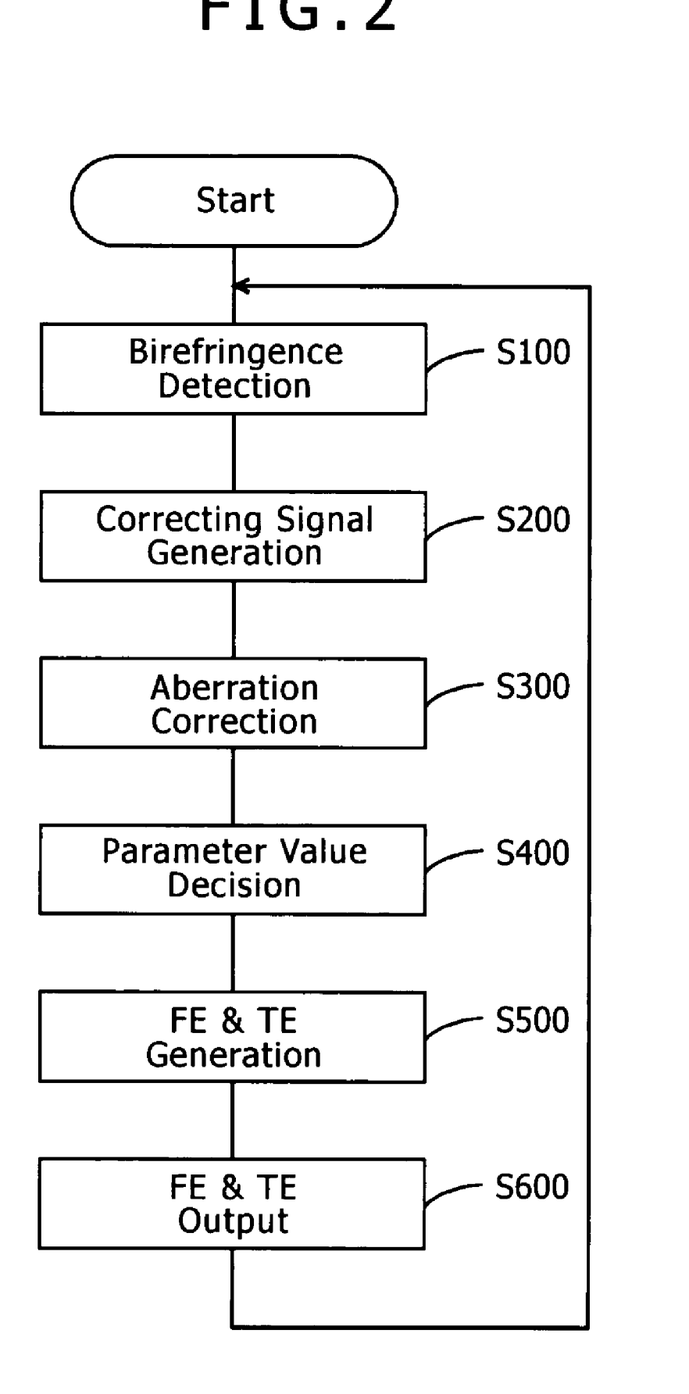
FIG. 2 is an example of a flowchart showing the contents of the processes of an aberration correction and a servo signal generation.

FIG. 2 is the flowchart showing the contents of the processes of an aberration correction and a servo signal generation performed according to predefined programs in the optical disk 100.

At Step 100 ("Step" will be omitted hereafter), the birefringence detecting unit 30 detects the degrees of the birefringent portions of the optical disk 200. The birefringence detecting unit 30 receives FE and TE generated by the servo signal generating unit 20, detects the asymmetric diversities of these signals, and grasps the degrees of birefringent portions based on the magnitudes of the asymmetric diversities.

Figure 3:
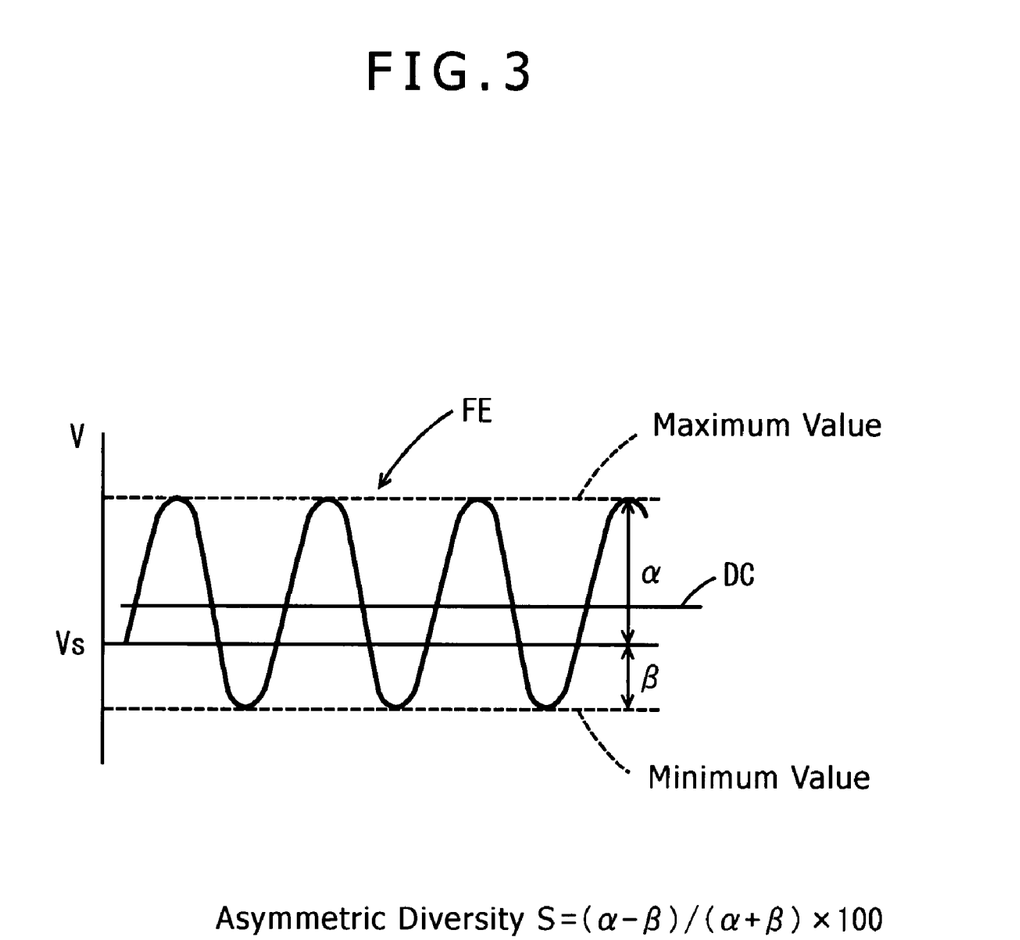
FIG. 3 is an example of an explanatory diagram of a method to detect birefringence.

FIG. 3 is an explanatory diagram of a method to detect the asymmetric diversities of servo signal waveforms. In FIG. 3, an explanation is made with an FE waveform taken for an example, and the similar method can be employed in detecting the asymmetric diversity of a TE waveform.

The birefringence detecting unit 30 calculates asymmetric diversity S (%) using the next equation, where Vs is a predefined reference potential; α is the difference between the maximum value of the waveform and Vs; and β is the difference between Vs and the minimum value of the waveform.

$$S=\{(\alpha-\beta)/(\alpha+\beta)\}\times 100 \tag{1}$$

In this embodiment of the present invention, the reference potential Vs is set about 1.65 V, the average of 0 V and 3.3 V, where 3.3 V is a drive voltage value of LSI mounted on the optical disk apparatus 100.

It can be said that the larger the value of S is, the larger the difference between the central value of the FE waveform's magnitude and the reference potential Vs is, that is, the larger the asymmetric diversity of FE is (the same is also true of TE). Using the above mentioned method, the birefringence detecting unit 30 detects the asymmetric diversities of FE and TE, and takes the asymmetric diversities as the degrees of the birefringent portions of the optical disk 200.

The method to detect the degree of the birefringent portion of the optical disk 200 is not restricted to the above mentioned one using the equation (1). After calculating the direct-current components of FE and TE, and the potential difference between the direct-current component of FE and the reference potential, and the potential difference between the direct-current component of the TE and the reference potential, the birefringence detecting unit 30 can define these potential differences as the degrees of birefringent portions. The direct-current component of FE can be obtained by letting FE pass through a smoothing circuit to get rid of the alternative-current component of FE (the same is also true of TE).

In FIG. 3, the direct-current component of FE is shown as DC, and the birefringence detecting unit 30 calculates the potential difference between DC and Vs. It can be said that the larger the absolute value of the potential difference calculated in this way is, the larger the difference between the central value of FE waveform's magnitude and the reference potential Vs is, that is, the larger the asymmetric diversity of FE is.

As described above, the birefringence detecting unit 30 detects the asymmetric diversities of FE and TE based on the method using equation (1) and/or the method using the calculated potential difference between the direct-current component and the reference potential Vs, and takes the magnitudes of the asymmetric diversities as the degrees of the birefringent portions of the optical disk 200.

At S200, the birefringence detecting unit 30 generates correcting signals to correct aberrations according to the degrees of the birefringent portions detected at S100. To be concrete, the birefringence detecting unit 30 generates a correcting signal to correct a spherical aberration (a spherical aberration correcting signal) according to the magnitude of the asymmetric diversity of FE, and a correcting signal to correct a coma spherical aberration (a coma spherical aberration correcting signal) according to the magnitude of the asymmetric diversity of TE.

Figure 4:
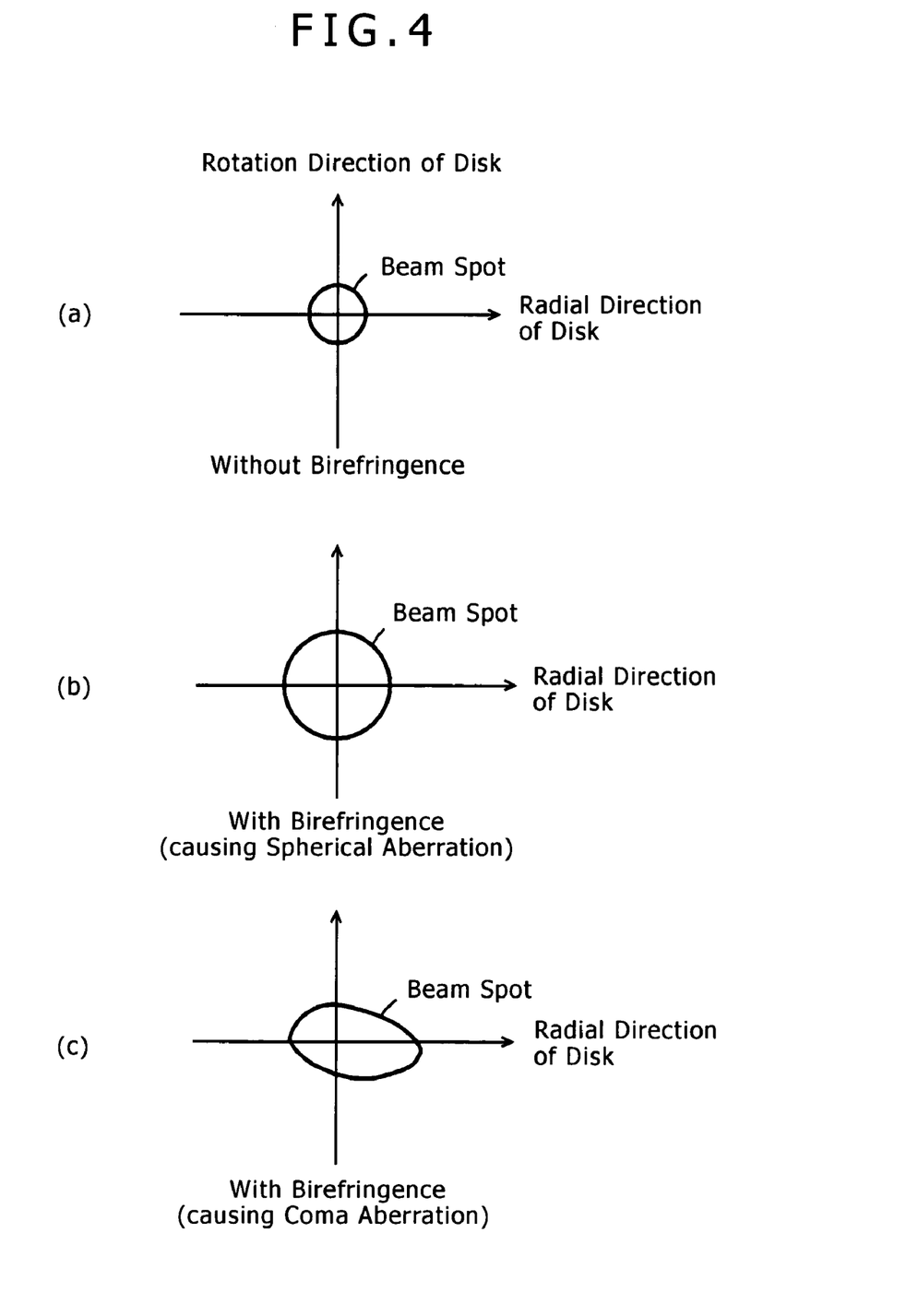
FIG. 4 is an example of a diagram showing the relations between some types of birefringent portions and the patterns of beam spots.

FIG. 4 shows the relations between some types of birefringent portions and the patterns of focused light spots (beam spots) of laser beams on the recording surface of the optical disk 200. FIG. 4(*a*) shows a beam spot without a birefringent portion on the optical disk 200. In the case where there is no birefringent portion, the pattern of a beam spot is approximately circular and the radius of the beam spot is smaller than in the following two cases. FIG. 4(*b*) and FIG. 4(*c*) show beam spots with some types of birefringent portions on the optical disk 200. In FIG. 4(*b*), the pattern of a beam spot is approximately circular and larger than in FIG. 4(*a*), which can be said to suggest that there is so called a spherical aberration owing to one type of birefringent portion. In FIG. 4(*c*), the pattern of a beam spot is extended approximately in the radial direction of the disk as compared with (a), which suggests that there is so called a coma aberration owing to the other type of birefringent portion.

In this embodiment of the present invention, if the asymmetric diversity of the FE signal waveform of servo signals generated with the use of the reflection lights from the optical disk 200 is large, it is judged that there is a birefringent portion causing the spherical aberration, and the spherical aberration correcting signal is generated according to the magnitude of the symmetric diversity of FE. On the other hand, if the asymmetric diversity of TE signal waveform of servo signals generated with the use of the reflection lights from the optical disk 200 is large, it is judged that there is a birefringent portion causing the coma aberration, and the coma aberration correcting signal is generated according to the magnitude of the symmetric diversity of TE.

The aberration correcting unit 13 is equipped with liquid crystal elements as aberration correcting elements and a liquid crystal driving circuit to drive the liquid crystal elements using driving signals. Both a spherical aberration correcting signal and a coma aberration correcting signal are liquid crystal driving voltages within 0 V to 3.3 V (or within 0 V to 5 V). The birefringence detecting unit 30 generates correcting signals by increasing the voltage levels of the correcting signals (for example, linearly) according to the magnitudes of the asymmetric diversities (for example, represented by percentage terms from 0% to 100%) of FE or TE.

At S300, the aberration correcting unit 13 corrects each aberration based on the corresponding correcting signal generated at S200. The liquid crystal has two types of electrodes, one is an electrode for correcting a spherical aberration, and the other is an electrode for correcting a coma aberration. The concrete examples of such electrodes used for correcting each aberration are disclosed, for example, in Japanese Unexamined Patent Application No. 2006-120297. In the aberration correcting unit 13, the liquid crystal driving circuit controls the applied voltages to the electrode for correcting a spherical aberration based on the spherical aberration correcting signals to change the directions of liquid crystal molecules. As a result, the refractive index with which laser beams pass through the liquid crystal elements is changed to correct the spherical aberration. The liquid crystal driving circuit also controls the applied voltages to the electrode for correcting a coma aberration based on the coma aberration correcting signals to change the directions of liquid crystal molecules. As a result, the refractive index with which laser beams pass through the liquid crystal element is changed to correct the coma aberration. In the above-mentioned descriptions, it is assumed that a liquid crystal element is used for the aberration correcting unit 13 to perform an aberration correction, but as alternative concrete elements, for example, a beam expander lens capable of changing the beam radiuses of laser beams, or a MEMS (Micro Electro Mechanical Systems) mirror capable of changing the reflection angle of any points of beam spots can be used.

At S400 and S500, the servo signal generating unit 20 generates FE and TE. The calculation of FE and TE is performed with the use of output values and parameters from the photo detector 16. As mentioned above, when two types of aberrations owing to birefringence are corrected at S400 and S500, the output values from the photo detector 16 to the servo signal generating unit 20 change. Therefore, if, after the aberration corrections are performed, FE or TE is generated with the use of the parameters set before the aberration corrections, these FE and TE signals are not always the optimal servo signals for the subsequent servo control. In some cases, there is a possibility that the servo control performed based on FE and TE will be excessive.

Therefore, at S400, the servo signal generating unit 20 determines parameters used for calculating FE and TE anew according to the correcting signals generated at S200. At S500, in the servo signal generating unit 20, FE and TE are given by the following equations (2) and (3) based on the parameters determined anew at S400 and the output values from the photo detector 16.

$$FE = FB1(Ia+Ic) - FB2(Ib+Id) + FO \quad (2)$$

$$TE = TB1(Ia+Id) - TB2(Ib+Ic) + TO \quad (3)$$

Figure 5:
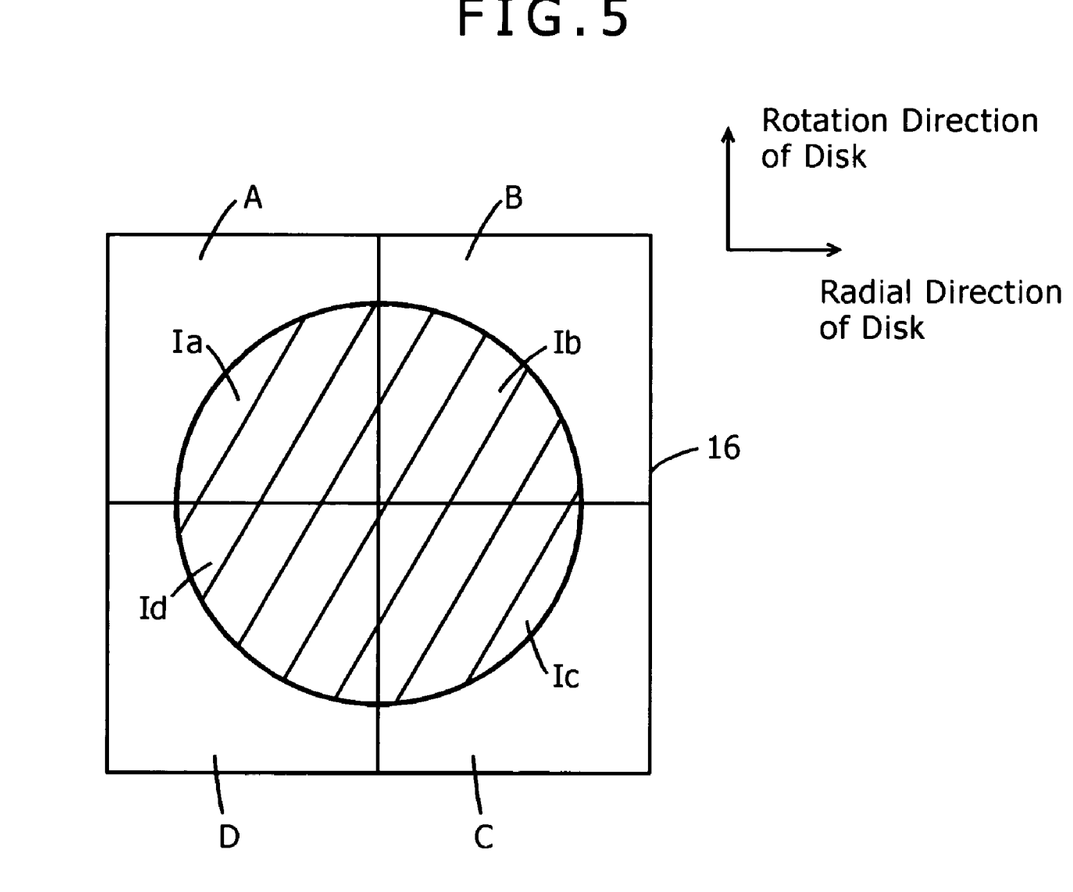
FIG. 5 is an example of a diagram showing the relations between light-sensitive elements of a photo detector and their output values.

Ia, Ib, Ic, and Id are electric signals output from four light-sensitive elements of the photo detector 16.

FIG. 5 shows the relations between four light-sensitive elements A, B, C, and D of a photo detector and their output values. The photo detector 16 is divided into four parts by the vertical line and the horizontal line passing through the near-center of the photo detector, and each part includes a light-sensitive element. In FIG. 5, the light-sensitive elements are termed a light-sensitive element A, B, C and D starting from the upper left corner element in clockwise direction. The output values from the light-sensitive element A, B, C, and D are represented as Ia, Ib, Ic, and Id.

A near-circle pattern with hatched lines in FIG. 5 represents the pattern of a reflected light the photo detector 16 receives from the optical disk 200. The relation between the area of a beam spot on the recording surface of the optical disk 200 and the pattern of the reflected light the photo detector 16 receives is as follows:

The direction from left to right in FIG. 5 corresponds to the radial direction from the center to the outside of the optical disk 200; and The upward and downward directions in FIG. 5 correspond to the rotation directions of the optical disk 200 (the directions of lines tangent to the circle of the optical disk 200).

In other words, the light-sensitive element B and C receive the reflected lights from the outer area that is about half of the area of a beam spot formed on the recording surface of the optical disk. The light-sensitive element A and D receive the reflected lights from the inner area that is about half of the area of a beam spot formed on the recording surface of the optical disk. Therefore, Ia+Id and Ib+Ic, which are terms of the equation for TE, represent the sums of the output values from two neighboring light-sensitive elements in terms of the rotation direction of the optical disk respectively. On the other hand, Ia+Ic and Ib+Id, which are terms of the equation for FE, represent the sums of the output values from two light-sensitive elements that are located diagonally in the photo detector 16 respectively.

Figure 6:
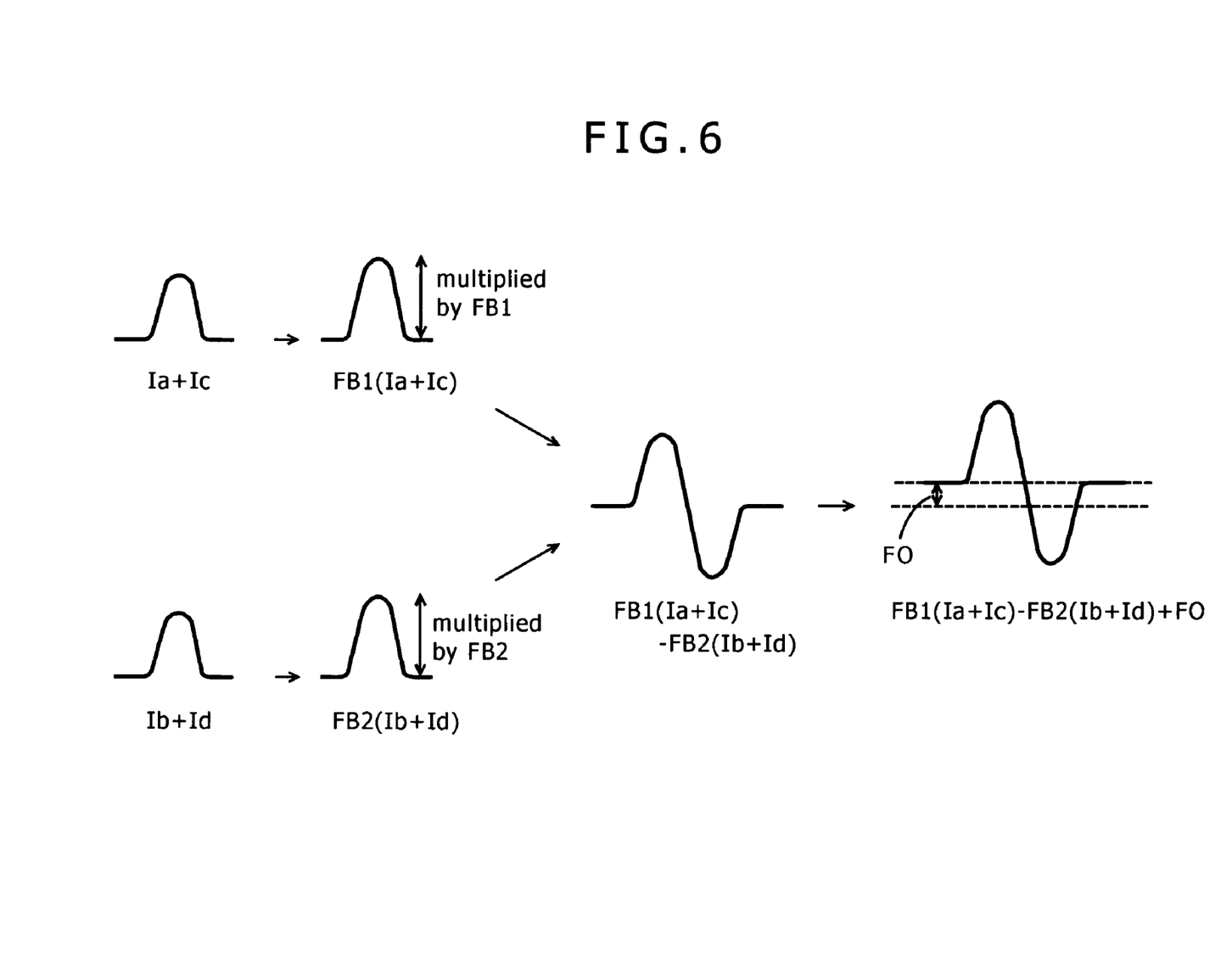
FIG. 6 is an example of a diagram showing an FE generating process.

FIG. 6 shows an FE generating process.

Both FB1 and FB2 are focal balance parameters. Ia+Ic is multiplied by FB1, and Ib+Id is multiplied by FB2. Then −FB2 (Ib+Id) and a parameter FO that gives an offset to FE are added to Fb1 (Ia+Ic), where FB1 and FB2 are parameters for redressing the balance of the amplitude of the FE waveform to make the waveform vertically symmetrical. A TE generating process is similar to the FE generating process. Ia+Id is multiplied by TB1, and Ib+Ic is multiplied by TB2. Then −TB2 (Ib+Ic) and a parameter TO that gives an offset to TE are added to TB1 (Ia+Id), where TB1 and TB2 are parameters for redressing the balance of the amplitude of the TE waveform to make the waveform vertically symmetrical.

As mentioned above, in this embodiment of the present invention, the parameters values FB1, FB2, FO, TB1, TB2, and TO are decided anew according to the correcting signals generated at S200. The determination of these parameters is performed with reference to a prepared parameter decision table. To be concrete, an information table, which defines values of FB1, FB2, and FO corresponding to values of spherical aberration correcting signals, is generated in advance, where the values of spherical aberration correcting signals are values that the birefringence detecting unit 30 can generate based on the variation characteristics of the output values from the photo detector 16 according to the amounts of spherical aberration corrections. In addition, another information table, which defines values of TB1, TB2, and TO corresponding to values of coma aberration correcting signals, is generated in advance, where the values of coma aberration correcting signals are values that the birefringence detecting unit 30 can generate based on the variation characteristics of the output values from the photo detector 16 according to the amounts of coma aberration corrections. The control unit 70 stores the tables generated in this way in a predefined memory area. The servo signal generating unit 20 refers to the tables stored in this way as needed.

Figure 7:
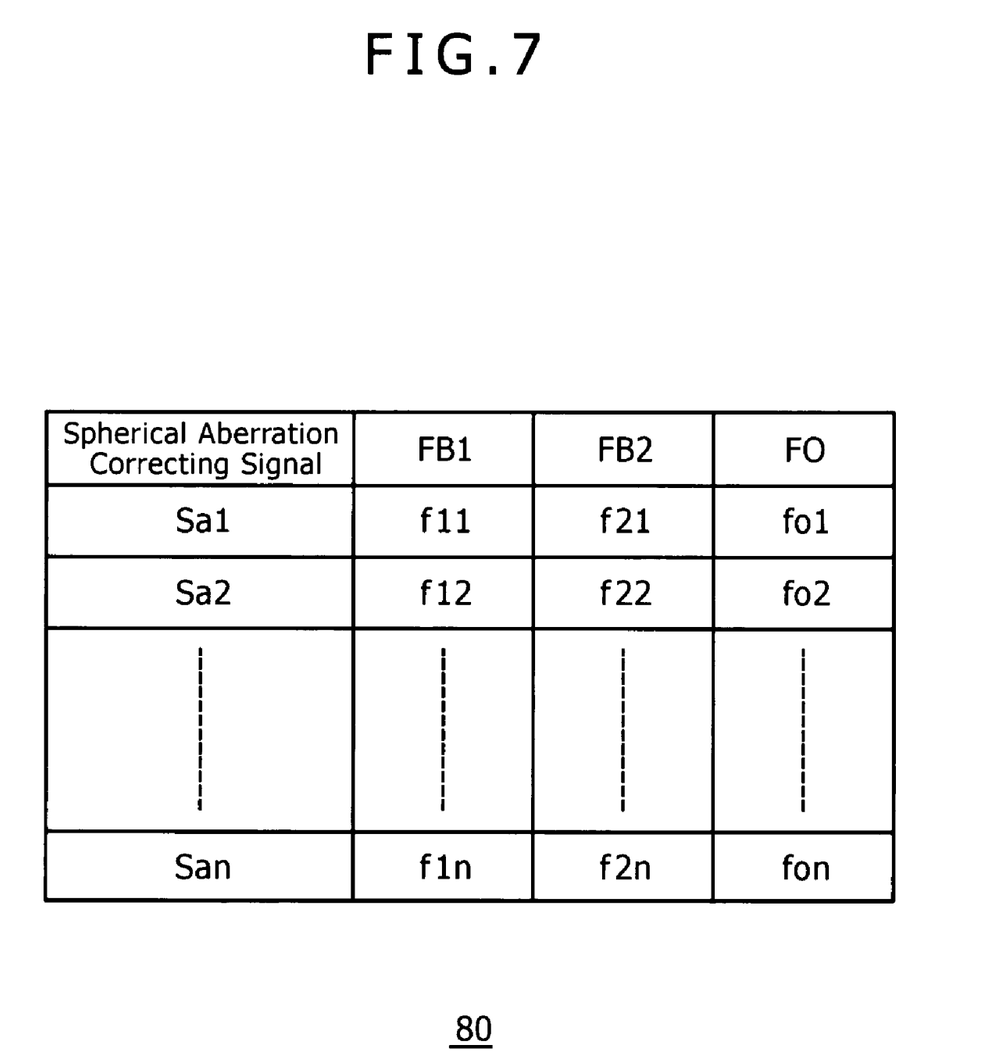
FIG. 7 is a diagram showing an example of a parameter decision table.

FIG. 7 shows an example of the parameter decision table 80 that defines the values of FB1, FB2, and FO corresponding to the values of spherical aberration correcting signals. AS shown in FIG. 7, the values of FB1, FB2, and FO corresponding to the values of spherical aberration correcting signals are uniquely decided. Therefore, the servo signal generating unit 20 can select the values of FB1, FB2, and FO corresponding to the values of spherical aberration correcting signals generated at S200 with reference to the table 80 at S400. At S500, FE is generated based on the selected values of FB1, FB2, and FO and the output values of the photo detector 16.

When generating TE, the servo signal generating unit 20 can select the values of TB1, TB2, and TO corresponding to the values of coma aberration correcting signals generated at S200 with reference to the table where the values of TB1, TB2, and TO corresponding to the values of coma aberration correcting signals are uniquely decided. At S500, TE is generated based on the selected values of TB1, TB2, and TO and the output values of the photo detector 16.

At S600, the servo signal generating unit 20 sends FE and TE generated at S500 to both the servo control unit 90 and the birefringence detecting unit 30. The servo control unit 90 performs the above mentioned servo control based on FE and TE. The birefringence detecting unit 30 performs the process of a birefringence detection again (at S100).

As to the parameter decision table, there can be plural parameter decision tables prepared in advance corresponding to conditions under which the characteristics of birefringence differ. The conditions under which the characteristics of birefringence differ can be the types of optical disks classified ,for example, by manufacturers of optical disks, production lots of optical disks, or product classes (work classes) of optical disks. In other words, different types of optical disks have different characteristics of birefringence. Therefore, it is necessary to prepare in advance one parameter decision table for each manufacturer of optical disks, wherein the parameter decision table stipulates the parameters values corresponding to the values of aberration correcting signals expected to be generated by the birefringence detecting unit 30 based on the degrees of the birefringent portions on the optical disks made by the manufacturer. As a result, the parameter decision tables are generated in advance on a one table on one manufacturer basis.

In the case where the parameter decision tables corresponding to the types of optical disks are stored in the predefined memory area of the control unit 70, at Step 400, the servo signal generating unit 20 first obtains the type of optical disk 200 (the manufacturer of the optical disk, the production lot, or the product class of the optical disk) on which data is stored or from which data is reproduced. Information that shows the type of optical disk 200 (disk type information) is stored in the optical disk itself, so that the data record reproducing unit 60 reads out necessary disk type information from the specific track of the optical disk 200 according to the control of the control unit 70, and sends the disk type information to the servo signal generating unit 20. The servo signal generating unit 20 selects the corresponding table out of the parameter decision tables stored corresponding to the types of optical disks based on the received information about the type of disk, and then selects the parameters based on the correcting signal generated at S200 with reference to the selected table.

The condition under which the characteristics of birefringence differ is not restricted to the type of optical disk. The characteristics of birefringence also differ according to the positions of the recording surface of an optical disk. For example, in the case where the optical pickup 10 moves from an outside track of the optical disk 200 to an inner track, the characteristics of birefringence gradually differ along the radial direction. In this case, it is necessary to divide the optical disk into plural areas along the radial direction of the optical disk and prepare in advance one parameter decision table for each area of the disk, wherein the parameter decision table stipulates the parameters values corresponding to the values of aberration correcting signals expected to be generated by the birefringence detecting unit 30 based on the degrees of the birefringent portions in the area.

In the case where the parameter decision tables corresponding to the areas of the optical disk are stored in the predefined memory area of the control unit 70, the servo signal generating unit 20 first obtains information about the position of the objective lens 11 facing the recording surface of the optical disk 200 at S400. As mentioned above, the optical pickup 10 can be moved according to the rotation of the guide rail that is mounted along the radial direction of the optical disk 200, and the position of the optical pickup 10 on the guide rail can be obtained by the current cumulative number of rotations of the guide rail. Therefore, the control unit 70 that controls the stepping motor for rotating the guide rail sends information about the position of the optical pickup 10 to the servo signal generating unit 20 based on the current cumulative number of rotations of the guide rail. The servo signal generating unit 20 considers received information about the optical pickup 10 as information about the objective lens 11, and selects the corresponding table out of the parameter decision tables stored corresponding to the areas of the optical disk based on information about the position of the objective lens 11, and then selects the parameters based on the correcting signals generated at S200 with reference to the selected table.

In addition, the characteristics of birefringence differ according to the temperature around the optical disk 200. Therefore, it is necessary to prepare in advance parameter decision tables corresponding to plural temperature ranges, wherein the parameter decision tables stipulate the parameters values corresponding to the values of aberration correcting signals expected to be generated by the birefringence detecting unit 30 based on the degrees of the birefringent portions on the optical disks within the respective temperature ranges.

In the case where the parameter decision tables corresponding to temperature ranges are stored in the predefined memory area of the control unit 70, the servo signal generating unit 20 first obtains information about the temperature around the optical disk 200 using a temperature sensor (not shown) mounted in the optical disk apparatus 100 at S400. The servo signal generating unit 20 selects the corresponding table out of the parameter decision tables stored corresponding to the temperature ranges based on the obtained information about the temperature, and then selects the parameters based on the correcting signals generated at S200 with reference to the selected table.

As described above, preparing a dedicated parameter decision table for every condition that shows different characteristics of birefringence of an optical disk from other. conditions makes it easy to decide parameters corresponding to the different results of aberration correction. In addition, parameter decision tables based on the combination of plural types of conditions, for example the combination of an area of an optical disk and a temperature range of the optical disk, can be prepared in advance.

As described above, according to the present invention, the birefringence detecting unit 30 detects the degrees of the birefringence of the optical disk 200 based on FE and TE, that is, servo signals, and generates aberration correcting signals based on the detected results. Then the aberration correcting unit 13 corrects spherical aberration and coma aberration based on the aberration correcting signals. In this way, the aberrations owing to the above mentioned birefringent portions are corrected, so that reproduced signals and servo signals generated with the use of the reflection lights from the optical disk 200 are prevented from deteriorating. In addition, when the servo signals (FE, TE) are generated after the aberration correction, the parameters such as FB1, FB2, FO, TB1, TB2 and TO are decided anew based on the values of the aberration correcting signals. As a result, even if the amounts of electric signals the servo signal generating unit 20 receives from the photo detector 16 change owing to the above mentioned aberration correction, FE and TE with well-balanced waveform amplitudes can be generated. Being optimal for the subsequent servo control, these FE and TE allow the stable servo control to be performed.

Here as an example of embodiments based on the concept of the present invention, an optical disk apparatus configured as follows can be obtained:

The optical disk apparatus, comprising: a light source for irradiating laser beams; an objective lens for focusing the irradiated laser beams on an opposite surface of an optical disk; an aberration correcting unit for providing driving signals to a liquid crystal element mounted between the light source and the objective lens to drive the liquid crystal element to correct aberrations generated around focused light spots of the laser beams; a division-structured detector, having a plurality of light-sensitive areas for receiving reflected lights from the optical disk, and for converting the lights received by the light-sensitive areas to electric signals to output; a servo signal generating unit for generating focus error signals (FE) and tracking error signals (TE) based on the electric signals sent from the division-structured detector; a servo control unit for generating focus driving signals based on the received FE and generating tracking driving signals based on the received TE; an actuator for putting the focused light spots on tracks of the optical disk by driving the objective lens toward both a focusing direction and a tracking direction based on the received focus driving signals and tracking driving signals; a birefringence detecting unit configured so that the birefringence detecting unit obtains a degree of a birefringent portion on a recording surface by detecting an asymmetric diversity of the received FE waveform expressed by a difference between a potential difference between a maximum value of FE and a predefined reference potential and a potential difference between the reference potential and a minimum value of FE and generates a spherical aberration correcting signal to correct the spherical aberration based on the degree of the birefringent portion and outputs the spherical aberration correcting signal, and obtains an another degree of a birefringent portion on the recording surface by detecting the asymmetric diversity of the received TE waveform expressed by a difference between a potential difference between a maximum value of TE and the reference potential and a potential difference between the reference potential and a minimum value of TE and generates a coma aberration correcting signal to correct the coma aberration based on the another degree of the birefringent portion and outputs the coma aberration correcting signal; the aberration correcting unit changes the directions of liquid crystal molecules by driving a predefined electrode pattern of the liquid crystal element based on the spherical aberration correcting signal to correct the spherical aberration, and changes the directions of liquid crystal molecules by driving a predefined electrode pattern of the liquid crystal element based on the coma aberration correcting signal to correct the coma aberration; the division-structured detector comprises four light-sensitive areas divided corresponding to the tracking direction and a rotating direction of the optical disk;

and when generating the FE and the TE by using electric signals (Ia, Ib, Ic and Id) outputted from the respective light-sensitive areas of the division-structured detector, focus balance parameters (FB1, FB2), a focus offset parameter (FO), tracking balance parameters (TB1, TB2), a tracking offset parameter (TO), and following equations $FE=FB1(Ia+Ic)-FB2(Ib+Id)+FO$ $TE=TB1(Ia+Id)-TB2(Ib+Ic)+TO,$ the servo signal generating unit decides the parameters FB1, FB2 and FO corresponding to the spherical aberration correcting signal and the parameters TB1, TB2 and TO corresponding to the coma aberration correcting signal by referring a parameter decision table that stipulate the values of FB1, FB2 and FO corresponding to the spherical aberration correcting signal and the values of TB1, TB2 and TO corresponding to the coma aberration correcting signal respectively, where Ia+Id represents the sum of a values of the electric signals output through an adjacent light-sensitive areas in terms of the rotating direction, Ib+Ic represents the sum of a values of the electric signals output through an adjacent light-sensitive areas in terms of the rotating direction, and Ia+Id represents a sum of a values of the electric signals output from the light-sensitive areas nearer a center of the optical disk in terms of the tracking direction, while Ia+Ic represents a sum of a values of the electric signals output through the light-sensitive areas that are located diagonally, Ib+Id represents a sum of a values of the electric signals output through the light-sensitive areas that are located diagonally.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. An optical disk apparatus, comprising:
   an aberration correcting unit for correcting aberrations generated when laser beams are focused on a recording surface of an optical disk with a use of an objective lens;
   a servo signal generating unit for generating servo signals based on reflected signals sent from the optical disk and outputting the servo signals;
   a servo control unit for putting focused light spots on tracks of the optical disk by controlling a drive of the objective lens based on received servo signals;
   a birefringence detecting unit configured so that the birefringence detecting unit detects a degree of the birefringent portions on the recording surface based on the received servo signals and generates aberration correcting signals to correct the aberrations based on the degree of the birefringent portions detected and outputs the aberration correcting signals;
   the aberration correcting unit is configured to correct the aberrations based on the received correcting signals through driving prescribed aberration correcting elements; and
   the servo signal generating unit, when generating the servo signals using electric signals according to the reflected signals and predefined parameters, determines parameter values according to a degree of the aberration correction.

2. The optical disk apparatus according to claim 1, wherein the birefringence detecting unit detects asymmetric diversities of the servo signal waveforms with reference to a predefined reference potential, and defines magnitude of the asymmetric diversities as the degree of birefringence.

3. The optical disk apparatus according to claim 1, wherein the birefringence detecting unit extracts the direct-current component of a servo signal and detects the potential difference between the potential of the direct-current component and a predefined reference potential, and defines magnitude of the potential difference as the degree of birefringence.

4. The optical disk apparatus according to claim 1, wherein the servo signal generating unit, equipped with a parameter decision table that stipulates the relation between the correcting signals and the parameter values in advance, decides parameter values according to the magnitude of the correcting signals with reference to the parameter decision table.

5. The optical disk apparatus according to claim 4, wherein the servo signal generating unit is equipped with a plurality of the parameter decision tables corresponding to the types of optical disks, obtains information about the type of the optical disk from which information is reproduced or to which information is recorded, and selects a parameter decision table according to the type of the optical disk, and decides the parameters values with reference to the selected parameter decision table.

6. The optical disk apparatus according to claim 4, wherein the servo signal generating unit is equipped with a plurality of the parameter decision tables corresponding to the positions of the recording surface of an optical disk, obtains information about the position of the objective lens facing the recording surface, and selects a parameter decision table according to the position of the objective lens, and decides the parameters values with reference to the selected parameter decision table.

7. The optical disk apparatus according to claim 4, wherein the servo signal generating unit is equipped with a plurality of the parameter decision tables corresponding to temperature ranges, obtains information about the temperature about the optical disk, and selects a parameter decision table according to the temperature, and decides the parameters values with reference to the selected parameter decision table.

8. The optical disk apparatus according to claim 1, wherein the servo signal generating unit generates a focus error signal (FE) as one type of servo signal, and the birefringence detecting unit generates a spherical aberration correcting signal to correct a spherical aberration according to the degree of birefringence detected with the use of FE; and the aberration correcting unit corrects the spherical aberration through driving the aberration correcting elements using the spherical aberration correcting signal.

9. The optical disk apparatus according to claim 1, wherein the servo signal generating unit generates a tracking error signal (TE) as one type of servo signal, and the birefringence detecting unit generates a coma aberration correcting signal to correct a coma aberration according to the degree of birefringence detected with the use of TE; and the aberration correcting unit corrects the coma aberration through driving the aberration correcting elements using the coma aberration correcting signal.

* * * * *